(12) United States Patent  (10) Patent No.: US 12,407,088 B2
Glaris et al.  (45) Date of Patent: Sep. 2, 2025

(54) METHOD FOR MANUFACTURING CHIP CARD MODULES AND BAND OF FLEXIBLE MATERIAL SUPPORTING SUCH MODULES

(71) Applicant: Linxens Holding, Mantes-la-Jolie (FR)

(72) Inventors: Patrice Glaris, Mantes-la-Jolie (FR); Yean-Wei Yeap, Singapore (SG); Olivier Thienard, Mantes-la-Jolie (FR); Valerie Mousque, Mantes-la-Jolie (FR)

(73) Assignee: Linxens Holding, Mantes-la-Jolie (FR)

( * ) Notice: Subject to any disclaimer, the term of this patent is extended or adjusted under 35 U.S.C. 154(b) by 204 days.

(21) Appl. No.: 18/275,438

(22) PCT Filed: Feb. 7, 2022

(86) PCT No.: PCT/EP2022/052825
§ 371 (c)(1),
(2) Date: Aug. 2, 2023

(87) PCT Pub. No.: WO2022/167634
PCT Pub. Date: Aug. 11, 2022

(65) Prior Publication Data
US 2024/0039142 A1   Feb. 1, 2024

(30) Foreign Application Priority Data
Feb. 8, 2021   (FR) .................. FR2101198

(51) Int. Cl.
*H01Q 1/22*   (2006.01)
(52) U.S. Cl.
CPC ................. *H01Q 1/2283* (2013.01)

(58) Field of Classification Search
CPC ....... G06K 19/07718; G06K 19/07747; G06K 19/07754; G06K 19/07769; G06K 19/18; H01Q 1/2283
See application file for complete search history.

(56) References Cited

U.S. PATENT DOCUMENTS

| 10,810,477 B2 | 10/2020 | Mathieu et al. ............... 235/487 |
| 2001/0007335 A1 | 7/2001 | Tuttle et al. |
| 2002/0132887 A1* | 9/2002 | Andersson .................. C09J 7/10 524/80 |
| 2008/0194765 A1* | 8/2008 | Becker .................. C08F 297/08 526/348 |
| 2011/0011939 A1 | 1/2011 | Seah ............................ 235/492 |

(Continued)

FOREIGN PATENT DOCUMENTS

| CN | 100595784 C | 3/2010 |
| EP | 3567527 A1 | 11/2019 |

(Continued)

*Primary Examiner* — Thien M Le
(74) *Attorney, Agent, or Firm* — McCarter & English LLP

(57) ABSTRACT

Method for the manufacture of a chip card module in which a polymer material including conductive particles is deposited in two connection wells or on two conductive pads formed in a conductive sheet positioned on the back face of the module. This polymer material forms, after deposition, an excess thickness on the back face which comes, during the insetting of the module, into contact with the ends of an antenna. Between the manufacture of the modules and their insetting, the modules are positioned on a strip which can be rolled up on itself for the purpose of its storage.

15 Claims, 2 Drawing Sheets

(56) References Cited

U.S. PATENT DOCUMENTS

| | | | |
|---|---|---|---|
| 2012/0147528 A1* | 6/2012 | Biler | H01G 9/042 361/523 |
| 2013/0295389 A1* | 11/2013 | Ishikawa | C09D 165/00 428/419 |
| 2014/0038077 A1* | 2/2014 | Takeuchi | H01M 8/0297 429/480 |
| 2017/0270398 A1* | 9/2017 | Mathieu | G06K 19/07722 |
| 2018/0194907 A1* | 7/2018 | La Camera | C08K 5/101 |
| 2020/0050025 A1* | 2/2020 | Bull | C08L 9/06 |
| 2021/0235602 A1* | 7/2021 | Kaner | H05K 9/0083 |
| 2024/0030558 A1* | 1/2024 | Kim | H01M 50/524 |

FOREIGN PATENT DOCUMENTS

| | | |
|---|---|---|
| EP | 3629244 A2 | 4/2020 |
| FR | 3009411 A1 | 2/2015 |
| TW | 200710739 A | 3/2007 |
| WO | WO 2015/097400 A1 | 7/2015 |

* cited by examiner

[Fig. 1]
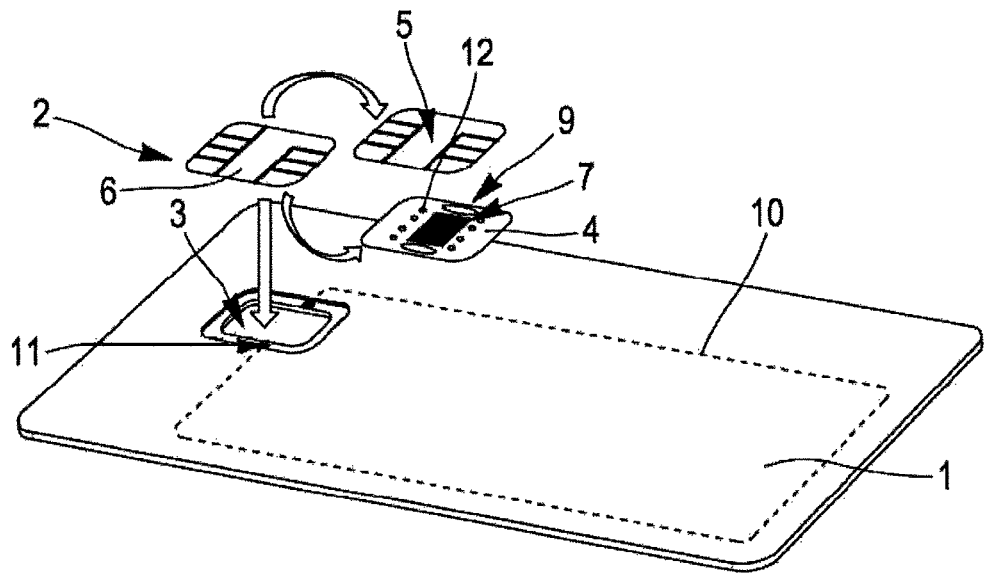
[Fig. 2]
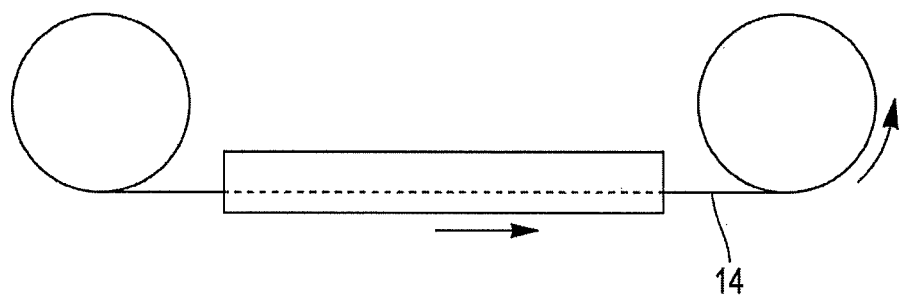
[Fig. 3]
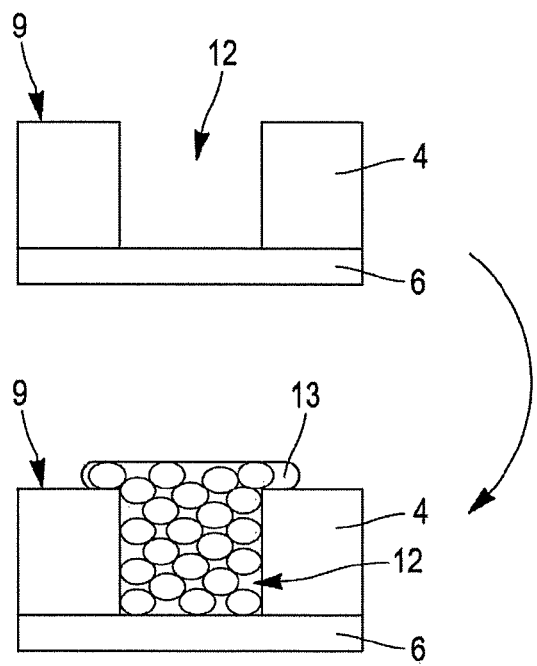

[Fig. 4]
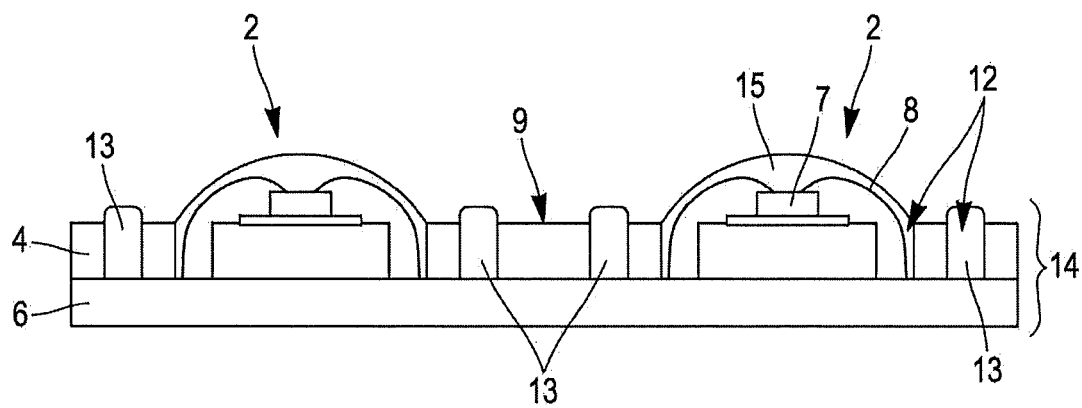
[Fig. 5]
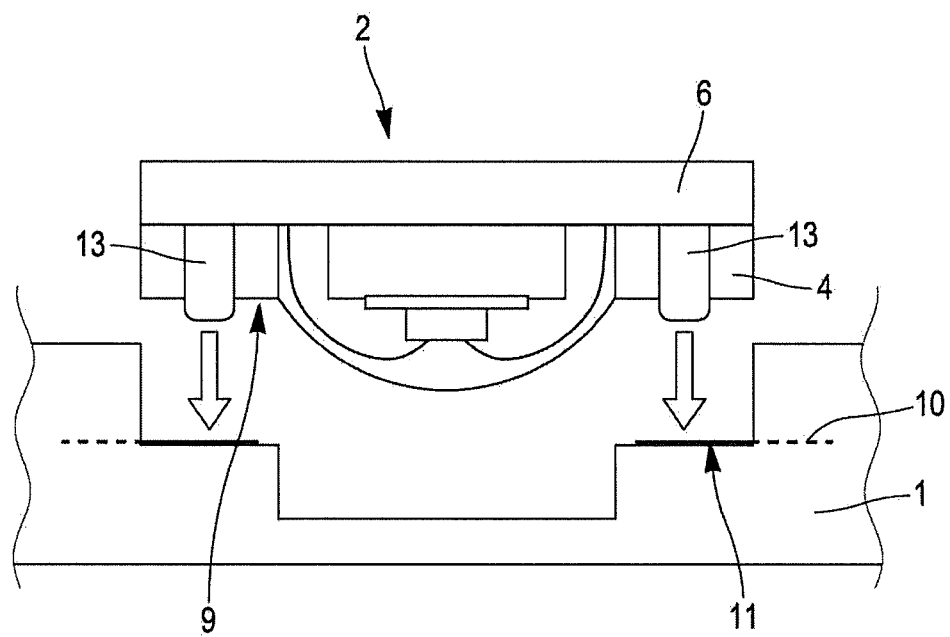
[Fig. 6]
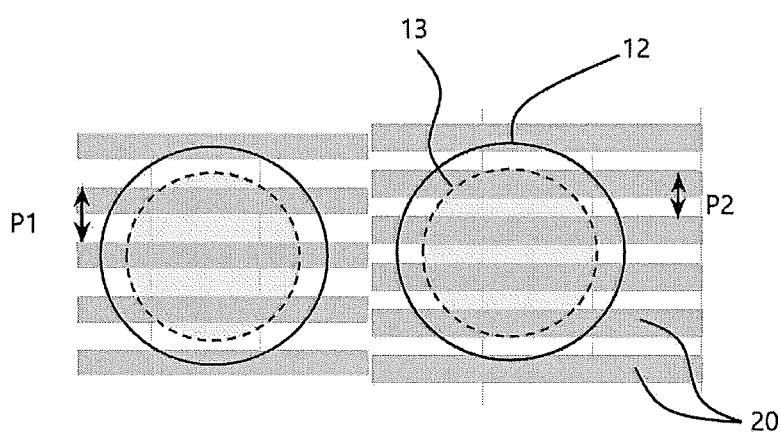

METHOD FOR MANUFACTURING CHIP CARD MODULES AND BAND OF FLEXIBLE MATERIAL SUPPORTING SUCH MODULES

CROSS REFERENCE TO RELATED APPLICATION

This patent application is a U.S. National Stage application of International Patent Application Number PCT/EP2022/052825 filed Feb. 7, 2022, which is hereby incorporated by reference in its entirety, and claims priority to FR 2101198 filed Feb. 8, 2021.

TECHNICAL FIELD

The invention relates to the field of chip cards. Chip cards are well known to the public, for which they have multiple uses: payment cards, SIM cards for cell phones, farecards, identity cards, and the like.

STATE OF THE ART

For example, chip cards comprise transmission means for transmitting data from the chip to a card reader device (reading) or from this device to the card (writing). These transmission means can be "contact", "contactless" or else with a dual interface when they combine the two preceding means. The invention relates notably to the field of dual-interface chip cards.

Dual-interface chip cards are generally composed of a rigid support, or card body, made of plastic of PVC, PVC/ABS, PET or polycarbonate type constituting the main part of the card, in which an electronic module and an antenna, each manufactured separately, are incorporated. The electronic module thus comprises a generally flexible printed circuit equipped with an electronic chip (integrated circuit) and contact pads electrically connected to the chip and flush with the electronic module, at the surface of the card body, for a connection by electrical contact with a card reader device. Dual-interface chip cards additionally comprise at least one antenna for transmitting data between the chip and a radiofrequency system making possible the contactless reading/writing of data.

In dual-interface chip cards, it is relatively difficult to provide an electrical connection between the module and the antenna which is robust and reliable so as to withstand the handling operations to which a chip card may be subjected. This connection must also be made in a sufficiently economical manner.

In addition, chip card modules possibly have to be stored on substrates for a relatively long time, which can range up to several months, before being used to finalize the manufacture of chip cards, notably by integrating each module in a card body and by connecting each module to an antenna integrated in the card body.

With a view to at least partially meeting the abovementioned requirements, a method for the manufacture of a chip card module is provided which comprises the provision of a dielectric substrate suitable for the production of flexible electrical circuits. The dielectric substrate has a thickness delimited by a front face and a back face, both forming the main faces of the substrate. Furthermore, the method comprises a deposition of a polymer material comprising conductive particles. This deposition can be carried out either in connection wells, to form the connection with conductive pads located on the front face, or directly on the conductive pads located on the back face. Thus, the polymer material comprising conductive particles can be deposited in at least two connection wells made in the thickness of the substrate, each of these connection wells being at least partially closed at the level of the front face of the substrate by a contact pad formed in a first conductive metal sheet (which is thus deposited on the front face of the flexible electrical circuit, corresponding to the contact face of the module (or contact side). Alternatively, the polymer material comprising conductive particles can be deposited on a conductive pad formed in a second metal sheet resting on the back face (or bonding side). Optionally therefore, the deposition of polymer material comprising conductive particles can be carried out in a connection well and on a conductive pad located on the back face. The deposition is carried out in a manner suitable for the polymer material comprising conductive particles to form, after deposition, an excess thickness on the back face (that is to say, in excess thickness on the back face itself, if the latter does not comprise a second conductive sheet—case of a circuit for a single-sided module—or in excess thickness with respect to the second conductive sheet—case of a circuit for a double-sided module).

After deposition, the polymer material comprising conductive particles undergoes setting. This setting stage is obtained spontaneously or by the implementation of one or more additional operations. More specifically, the polymer material comprising conductive particles is set immediately after deposition, either spontaneously due to its rheological properties and/or due to its thermal transitions, or by the implementation of one or more additional operations targeted at initiating and/or carrying out all or part of its polymerization or its crosslinking (for example irradiation under ultraviolet radiation, exposure to a heat source, and the like). Setting occurs prior to a storage operation during which at least one substrate portion, provided with the first conductive sheet and with the polymer material comprising conductive particles, is positioned above or below another substrate portion. This is because, for storage, it is possible to roll up the substrate in a roll on itself or to deposit substrate portions in the form of plates, one on top of the other. Optionally, the method comprises an operation of crosslinking the conductive polymer material after the substrate has been rolled up or stacked on itself. This crosslinking operation is targeted at conferring, on the conductive polymer material, its definitive rheological properties.

By virtue of the modification of the viscoelastic properties of the polymer material comprising conductive particles during setting, after deposition, it is possible to store the modules (finished but not yet separated from one another) on strips of flexible material (in the case in point, the dielectric substrate) stored with a covering of certain substrate portions, without the polymer material comprising conductive particles adhering to the portion of the strip located below or above them, or also to an inserted material which would be placed between the substrate portions rolled up or stacked one on top of the other.

For example, in the case where the polymer material comprising conductive particles is a "thermosetting" polymer, an additional operation targeted at at least partially crosslinking the polymer material can be implemented. This crosslinking operation can be carried out while the substrate strip is already rolled up on itself or in plates stacked one on top of the other. In the case of thermal crosslinking, the temperature applied is sufficiently high (for example, greater than 50° C.) to confer, on the polymer material, its final properties but sufficiently low (for example, less than 150°

C.) not to detrimentally affect the other components of the module and not to bring about the flow of the polymer which is not yet crosslinked.

The polymer comprising conductive particles, thus cured either by temperature crosslinking or by solidification due to its cooling or also due to its polymerization, becomes a material having a storage modulus of less than or equal to $10^8$ Pa and greater than or equal to $10^3$ Pa, under oscillatory stress at a frequency of 1 Hertz, and at a temperature of between 120 and 170° C. These properties of the polymer comprising conductive particles thus cured nevertheless remain compatible with a reactivation of the adhesion and/or a reactivation of the tack which are sufficient to connect each module to an antenna by applying at least one pressure to the connection pads of the antenna, and more particularly at least to the areas at which the polymer material comprising conductive particles is located.

On the occasion of the application of pressure targeted at connecting the module to an antenna, an increase in the working temperature can facilitate the reactivation of the adhesive properties of the polymer comprising conductive particles. For example, this operation is performed at the same time or instead of the operation consisting in attaching the module to the card body using a hot-melt adhesive.

In addition, the abovementioned method advantageously comprises one or the other of the following characteristics, considered independently of one another or in combination with one or more other characteristics:
- the deposition of the polymer material comprising conductive particles is carried out at a temperature of between 20 and 120° C., for example at a temperature of between 20 and 70° C.;
- the polymer material comprising conductive particles is a resin having a viscosity, during its deposition, of between 1000 mPa·s and 100 000 mPa·s, under oscillatory shear stress at a frequency of 10 Hz at 25° C.; for example, the polymer material is a one-component resin or a two-component resin; alternatively, the polymer material is a thermoplastic resin having a melting point of between 90 and 140° C. and a viscosity, during its deposition, of between 1000 and 100 000 mPa·s, under oscillatory shear stress at a frequency of 10 Hz at 25° C., said deposition being carried out at a temperature of between 90 and 140° C.; alternatively again, the polymer material is a pressure-sensitive polymer having a viscosity, during its deposition, of between 1000 mPa·s and 100 000 mPa·s, under oscillatory shear stress at a frequency of 10 Hz at
- the polymer material comprising conductive particles has thixotropic properties characterized by an increase in the viscosity up to a value at least equal to 300 000 mPa·s (and preferentially greater than 500 000 mPa·S), under oscillatory shear and at a frequency of 0.1 Hz at a temperature of 25° C., in a time interval ranging from 0 seconds to 600 seconds after the deposition of the polymer material: such thixotropic properties make it possible for it to set spontaneously; in this case, the method may not comprise an additional setting operation;
- the setting of the polymer material after its deposition is obtained by crosslinking under ultraviolet radiation, in a time of less than 600 seconds after this deposition.

According to another aspect of the invention, there is provided a method for the interconnection of an antenna and of a chip card module comprising:
- the provision of a chip card module obtained by a method as mentioned above,
- the provision of a card body in which is integrated an antenna comprising at least two connection pads, and
- the connection of at least one of the two connection pads with a contact pad at least partially closing a connection well in which is deposited polymer material comprising conductive particles, or with a conductive pad formed in the second conductive sheet resting on the back face and on which is deposited polymer material comprising conductive particles, this connection being made by applying a pressure of between and 5 bars, with a thermode, the temperature of which is between 170 and 210° C., and for a time of less than 3 seconds.

According to another aspect of the invention, there is provided a strip of flexible material supporting a plurality of chip card modules which are obtained by a method as mentioned above, rolled up on itself or in plates stacked one on top of the other (with or without inserted material between two superimposed layers of this strip).

According to another aspect of the invention, there is provided a dual-interface chip card comprising a module and an antenna which are interconnected using a method as mentioned above.

Other characteristics and advantages of the invention will become apparent on reading the detailed description and from the appended drawings, in which:

FIG. 1 diagrammatically represents, in perspective, an example of a dual-interface chip card in which the module has not yet been integrated, the module being represented three times, including twice with the contact face visible and once with the connection face visible;

FIG. 2 diagrammatically represents an example of implementation of a method for the reel-to-reel manufacture of a chip card module;

FIG. 3 represents in section, partially and diagrammatically, an example of implementation of one of the operations of the method represented in FIG. 2, this operation corresponding to the filling of certain connection wells with a material comprising electrically conductive particles;

FIG. 4 represents in section, partially and diagrammatically, before rolling onto a storage reel, a strip of flexible material supporting a plurality of chip card modules which are obtained by the method represented in FIG. 2;

FIG. 5 represents in section, partially and diagrammatically, an example of implementation of an operation for insetting a chip card module obtained by the method represented in FIG. 2; and FIG. 6 diagrammatically represents the grip of the material comprising electrically conductive particles on tracks of an antenna end.

As represented in FIG. 1, the invention can be used for the production of a chip card 1 (of bank card or other type). This card 1 comprises a module 2 intended to be inserted into a cavity 3, for example milled into the body of the card 1. This module 2 consists of a flexible electrical circuit comprising a dielectric substrate 4. The substrate 4 initially exists in the form of a strip of material having a first main face and a second main face essentially parallel to each other and spaced apart by the thickness of the substrate 4. The substrate 4 has a thickness, a suppleness and a flexibility compatible with, on the one hand, its use in a continuous reel-to-reel manufacturing method and, on the other hand, with the norms and standards which determine the maximum thickness of the finished chip cards. The example of implementation of the method according to the invention described below and illustrated by the figures relates to a reel-to-reel (or roll-to-roll) use of the substrate 4 and/or a use comprising at least one operation of storage as a reel.

Alternatively, the method according to the invention can be implemented with a substrate 4 in the form of a plate, and/or can comprise at least one operation of storage as substrate plates. The substrate 4 is generally thin. Its thickness, advantageously of less than 400 μm, is, for example, of the order of 20 to 200 μm, indeed even of between 50 and 150 μm. This substrate 4, for example, is constituted of a flexible strip of plastic material (polyimide, PET, PEN, PVC, and the like) or of composite material (epoxy glass).

Conductive pads electrically insulated from one another are produced, in a first conductive sheet 6, on one of the faces of the substrate 4, referred to as front face 5 (or contact face). These conductive pads can comprise contacts intended to establish a contact with a card reader and also other conductive pads, not used in the connection with the contacts of a card reader. The conductive pads can be produced by etching the first conductive sheet 6. The latter is constituted of an electrically conductive material, such as a copper alloy (alternatively, aluminum, an aluminum alloy or a steel can also constitute this electrically conductive material). In this case, prior to its etching, the first conductive sheet 6 is bonded to and/or laminated on the substrate 4, with or without a layer of adhesive between the substrate 4 and the first conductive sheet 6. Alternatively, the production of the conductive pads can be carried out by the lead frame technique in the first conductive sheet 6, prior to its bonding to and/or its lamination on the substrate 4 (also with or without a layer of adhesive between the substrate 4 and the first conductive sheet 6).

In all cases, the first conductive sheet 6 is thus finally supported by the substrate 4, with one face turned toward a first main face, corresponding to the front face 5 of the substrate 4 (see FIGS. 3 to 5), while the other side is intended to establish a connection by electrical contact with a chip card reader. The first conductive sheet 6 can receive, on one and/or the other of its faces, various layers of metallization (nickel, gold, palladium, and the like). The quality of the face of the first conductive sheet 6 (generally metallized) turned toward the substrate 4 is important, notably in order to ensure a good connection to the chip 7, for example by soldering of conductive wires 8. The substrate 4 with the conductive pads 6 constitutes a metallized flexible electric circuit.

On the second main face of the substrate 4, known as the back face 9 (or connection face), the substrate 4 supports the electronic chip 7. The mechanical fixation of the chip 7 to the substrate 4 is produced by at least one known technique, such as die attach, and its electrical connection to the conductive pads is produced by at least one known technique, such as flip chip, wire bonding, and the like. In the embodiment described below, the wire bonding technique is used as example.

An antenna 10 (of Class 1 or Class 2 size according to the standard ISO 14443-1, for example), can comprise several turns and is inserted into the body of the card 1, between two laminated layers. The ends 11 of this antenna 10 are accessible in the cavity 3, after milling of the latter, for a connection with the chip 7.

The conductive pads intended to form contacts are connected to the chip 7 with conductive wires 8 (not visible in FIG. 1 but represented in FIGS. 4 and 5) through connection wells 12 made in the substrate 4. These connection wells 12 are, for example, produced by mechanical perforation of the substrate 4, before lamination of the first conductive sheet 6 with the substrate 4. Alternatively, they can be produced with a laser (for example in the case of the use of a laminated substrate, such as a copper laminate or copper clad laminate). The first conductive sheet 6 then at least partly covers the connection wells 12. The face of the first conductive sheet 6 turned toward the substrate 4 thus forms the bottom of these connection wells 12. The connection wells 12 then form blind holes and make possible access to the front face 5 from the back face 9, with only the first conductive layer 6 on the front face 5.

The dimensions and positions of the conductive pads are defined so as to satisfy the standard ISO 7816-2 notably. For example, according to the standard ISO 7816-2, the conductive pads are named C1 to C8 for a module 2 having eight contacts. In this case, the conductive pads C1, C2, C3, C5, C6 and C7 are planned to establish communication with the chip 7, by contact on the front face 6. There thus remain at least two conductive pads, under each of which respectively is a connection well 12, and which can be used to participate in the connection of the antenna 10 to the chip 7. To this end, as represented in FIG. 3, a polymer material 13 comprising conductive particles is deposited in each of these two connection wells 12. Each of these two connection wells 12 is filled with this polymer material 13 by dispensing or by jet of a drop of it (alternatively, a screen printing method can be used).

During its deposition in the connection wells 12, the polymer material 13 has thixotropic properties such that they make possible an increase, during a time ranging from 0 seconds to 600 seconds after the deposition, in the viscosity up to a value of greater than 300 000 mPa·s, under oscillatory shear and at a frequency of 0.1 Hz.

EXAMPLE 1: TWO-COMPONENT EPOXY ADHESIVE

According to a first example, a chip 7 is fixed to the back face 9 of the substrate 4 using a chip fixing technology, as mentioned above. The chip 7 is electrically connected to some conductive pads using connection wires 8. The chip 7 and its connection wires 8 are encapsulated in an encapsulation resin 15 crosslinked, after its deposition, under ultraviolet radiation. This crosslinking can be carried out notably in two stages: a first stage shortly after its deposition and a second stage, called postcrosslinking, intended to optimize its mechanical properties.

The polymer material 13 is a two-component resin prepared by mixing the two parts under the conditions recommended by the supplier. Using dispensing equipment, the mixture thus prepared and constituting the polymer material 13 comprising conductive particles is deposited at ambient temperature in at least one connection hole 12. The polymer material 13 is, for example, a two-component epoxy resin constituted of an epoxy polymer and of conductive particles of silver particle type.

At the time of its deposition in the connection wells 12, the polymer material 13 comprising conductive particles has a viscosity, the value of which is compatible with the deposition of the polymer material 13 by dispensing in the connection holes 12. For example, this value of the viscosity is of between 30 000 and 60 000 mPa·s under oscillatory shear stress carried out at 25° C. at a frequency of 10 Hz.

Immediately after the dispensing of the polymer material 13 comprising conductive particles, its viscosity increases beyond a value of 500 000 mPa·s. This increase in viscosity allows the solidification of the material 13 without the latter having been crosslinked at this stage of the method. Thus set, the shape of the drop of polymer material 13 remains stable in the absence of stress (such as the pressure of a finger, the pressure of a liner, contact with a foreign body, and the like). This increase in the viscosity makes it possible to roll up the substrate in the form of a reel without modifying the shape of the polymer material 13 initially given during the dispensing.

The strip of flexible substrate 4, thus rolled up on itself, is brought to a temperature of 70° C. for 12 hours. This operation, which is targeted initially at ensuring the post-crosslinking of the encapsulation resin 15, is advantageously used to crosslink at the same time the conductive polymer material 13 deposited beforehand by dispensing.

On conclusion of this crosslinking operation, the polymer material 13 has a storage modulus, under oscillatory tensile stress at 1 Hz, equal to $3.5 \times 10^{7}$ Pa, for a measurement temperature of between 120 and 170° C.

During insetting (operation consisting in integrating the module 2 in the body of a chip card 1), the polymer material 13, which has retained the abovementioned viscoelastic properties, establishes an elastic electrical connection with each of the ends 11 of the antenna 10. A pressure is applied to the module 2, at least at the level of the connection wells 12 filled with polymer material 13. This pressure, advantageously close to or equal to 1 bar, is applied, for a time advantageously close to or equal to 1 second, with a thermode, the temperature of which is between 170 and 190° C.

EXAMPLE 2: ONE-COMPONENT EPOXY RESIN

According to a second example, the method described above in relation to the first example (two-component resin) differs essentially from the latter only in that the polymer material 13 is a one-component epoxy resin. For example, it is a resin, the trade name of which is comprised in the following list: Henkel CA3556HF, Henkel ICP8282.

Example 3: THERMOPLASTIC HAVING A MELTING POINT OF BETWEEN 100° C. AND 140° C.

According to a third example, a chip 7 is fixed to the back face 9 of the substrate 4 using a chip fixing technology, as mentioned above. The chip 7 is electrically connected to some conductive pads using connection wires 8. The chip 7 and its connection wires 8 are encapsulated in an encapsulation resin 15 crosslinked, after its deposition, under ultraviolet radiation.

The polymer material 13 is, for example, a conductive adhesive constituted of a thermoplastic polymer and of conductive particles. For example, it is a thermoplastic polyester resin charged with silver particles.

The polymer material 13 comprising conductive particles has a melting point of 100° C. and its deposition in the connection wells 12 is then carried out at a temperature of 120° C.

At the time of its deposition in the connection wells 12, the polymer material 13 comprising conductive particles has a viscosity of less than 100 000 mPa·s.

Immediately after dispensing of the polymer material 13 comprising conductive particles and within a time interval of less than 600 seconds, the temperature of the polymer material 13 is brought back below its melting point. This results in a recrystallization which makes it possible to increase the viscosity of the polymer material 13 up to a value of greater than 300 000 mPa·s. With such a viscosity, the shape of the drop of polymer material 13 deposited at the connection holes 12 remains stable in the absence of stress. The increase in the viscosity then makes it possible to roll up the substrate 4 in the form of a reel without modifying the shape of the polymer material 13 initially given during the dispensing.

The polymer material 13 has a storage modulus, at 1 Hz, of less than or equal to $10^{8}$ Pa and of greater than or equal to $10^{3}$ Pa, at a temperature of between 120 and 170° C.

During the insetting, the polymer material 13, the viscoelastic properties of which are those mentioned above, establishes an elastic electrical connection with each of the ends 11. A pressure is applied to the module 2, at least at the level of the connection wells 12 filled with polymer material 13. This pressure, advantageously close to or equal to 1 bar, is applied, for a time of 2.5 seconds, with a thermode having a temperature of between 170 and 190° C.

EXAMPLE 4: PRESSURE-SENSITIVE POLYMER

According to a fourth example, a chip 7 is fixed to the back face 9 of the substrate 4 using a chip fixing technology, as mentioned above. The chip 7 is electrically connected to some conductive pads using connection wires 8. The chip 7 and its connection wires 8 are encapsulated in an encapsulation resin 15 crosslinked, after its deposition, under ultraviolet radiation.

The polymer material 13 comprising conductive particles is deposited at ambient temperature in at least one connection hole 12. For example, the polymer material 13 comprising conductive particles corresponds to a formulation of acrylic monomers and oligomers which are polymerizable by UV and which is charged with conductive particles. For example, it is the resin sold under the reference 127-41 by Creative Materials.

At the time of the deposition of the polymer material 13 comprising conductive particles, its viscosity is of the order of 20 000 to 30 000 mPa·s, under the following measurement conditions: oscillatory shear stress, at a frequency of 10 Hertz and at a temperature of 25° C. This viscosity makes possible the dispensing of the polymer material 13 comprising conductive particles in the connection holes 12.

Immediately after the dispensing of the polymer material 13 comprising conductive particles, the flexible strip of the substrate 4 is exposed, for a period of time of between a few seconds (for example 2 seconds) and one minute, to ultraviolet radiation generated by a mercury vapor lamp. The polymer material 13 comprising conductive particles which is thus polymerized forms a pressure-sensitive adhesive. After this polymerization, the shape of the drop of polymer material 13 deposited at the connection holes 12 remains stable.

Optionally, the encapsulation resin 15 undergoes a post-crosslinking operation by exposing it to a temperature of 70° C. for 12 hours.

On conclusion of the polymerization, the polymer material 13 has a storage modulus, under oscillatory shear stress at 1 Hz, of the order of $10^{3}$ Pa·s, at a temperature of between 120 and 170° C.

During the insetting, the polymer material 13 establishes an elastic electrical connection with each of the ends 11 of the antenna 10. A pressure is applied to the module 2, at least at the level of the connection wells 12 filled with polymer material 13. This pressure, advantageously close to or equal to 1 bar, is applied, for a period of time advantageously close to or equal to 2 seconds, using a thermode, the temperature of which is of between 170 and 210° C. In this example, the tack of the polymer material 13 contributes to generating a lasting adhesion between the polymer material 13 and the ends 11 of the antenna 10.

In all cases, and notably for the abovementioned examples, the deposition of the drop of polymer material 13 is carried out in a manner suitable for the polymer material 13 comprising conductive particles to form, after deposition, a dome of excess thickness on the back face 9. This operation of deposition of a drop of polymer material 13 in a connection well 12 can be carried out continuously, roll-to-roll, as illustrated in FIG. 2, after operations of photolithography (to form the conductive pads in the first conductive sheet 6), of electrodeposition of metal layers (nickel, gold and/or palladium, for example), and the like.

Advantageously, the polymer material 13, after its deposition in the connection wells 12 and an optional setting or curing operation, only develops adhesion properties when it is subjected to a pressure.

On conclusion of the treatments corresponding to the method described and illustrated with the help of the above examples, a strip 14 of flexible material which supports a plurality of chip card modules is obtained. This strip 14 is then rolled up on itself, with or without inserted material between two superimposed layers or turns of this strip 14. In other words, due to its properties after setting or curing, the polymer material 13 does not adhere to the surfaces of the strip 14 which are brought into contact with it during the rolling up of the strip 14 and its storage as a reel. Nevertheless, an inserted material can be used to ensure mechanical protection of the chip card modules.

A portion of this strip 14 is represented in FIG. 4. This strip 14 portion corresponds, for example, to what is obtained after unrolling the strip 14, with a view to the insetting of the modules 2 which it comprises. On the portion represented, there are two modules 2. Each module 2 comprises a chip 7 connected, to contacts etched in the first conductive sheet 6, by conductive wires 8 passing through connection wells 12. Each chip 7 and also the conductive wires which are connected to it are protected by an encapsulation resin 15 (glob top). Outside the encapsulation resin 15, thus not covered with the encapsulation resin 15, at least two connection wells 12 remain for each module 2. Each of these two connection wells 12 is filled with set cured polymer material 13. The polymer material 13 protrudes, as excess thickness, on the back face 9. For example, the polymer material 13 protrudes by a height of between 60 and 250 micrometers; for example, this height is close to 150 micrometers.

Before insetting, the modules 2 are separated from one another. As represented in FIG. 5, each module 2 is inset by placing it in a cavity 3 milled beforehand in the body of the card 1. The milling reveals notably the ends 11 of the antenna 10. These ends 11 are, for example, each respectively provided with a small conductive plate to which each of them is connected (for example by soldering). Alternatively, the ends 11 form zigzags. As illustrated diagrammatically by FIG. 6, such zigzags comprise tracks (formed of wires recessed into a support or of strips etched in a conductive layer supported by an insulating substrate). The spacing between the tracks 20 determines a pitch. These tracks 20 are separated from one another with a certain more or less regular pitch (in FIG. 6, the ends of the tracks 20 interconnected to form the zigzag are not represented). On the left in FIG. 6, the tracks 20 are separated by a pitch P1 greater than the pitch P2 of the tracks 20 represented on the right. The result is that the dome of material 13 comprising conductive particles filling a connection hole 12 electrically connects fewer tracks 20 in the configuration illustrated on the left than in the configuration illustrated on the right (3 tracks on the left, 4 tracks on the right). Thus, advantageously, the pitch of the tracks 20 forming a zigzag is less than or equal to 250 micrometers and more preferentially close to or equal to 200 micrometers. If the tracks are too far apart, it may happen that the material 13 comprising conductive particles, notably if it is not centered with respect to the zigzag, no longer establishes a sufficient electrical connection with the ends 11 of the antenna 10.

Optionally, the module 2 is adhesively bonded in its cavity 3 using a hot-melt adhesive and a pressure is applied to the polymer material 13 and at the level of the hot-melt adhesive during the operation of adhesive bonding of the module 2 in its cavity 3.

In essence, the polymer material 13 has, at the time of its deposition in a connection well 12, a viscosity advantageously of less than 100 000 mPa·s, measured under oscillatory shear stress at 25° C. and at a frequency of 10 Hz. After this deposition, the polymer material 13 sets spontaneously or undergoes an operation in order for it to set, so that it has a storage modulus, under oscillatory shear stress at 1 Hz, of between $10^3$ Pa·s and $10^8$ Pa·s, at a temperature of between 120 and 170° C. At the time of the insetting, the polymer material 13 is subjected to a pressure, and also to possible heating, in order to reactivate its adhesive and/or tack properties.

A method for the manufacture of a single-sided module 2, that is to say a module comprising only a first conductive sheet 6 at the front face, has been described above. In this case, the polymer material 13 is deposited in connection wells 12. However, the invention also relates to a method for the manufacture of a double-sided module 2. In this case, the substrate 4 comprises a first conductive sheet and a second conductive sheet, respectively on each of its main faces. The polymer material 13 can then be deposited on conductive pads formed in the second conductive sheet which is thus on the back face of the substrate 4. The operations subsequent to the deposition of the polymer material 13 on these conductive pads are analogous to those described above in connection with the production of a single-sided module.

The invention claimed is:

1. A method for the manufacture of at least one chip card module comprising:
   the provision of a flexible dielectric substrate as a strip, the substrate having a thickness delimited by a front face and a back face, both forming the main faces of the substrate, with at least one conductive pad formed in a first conductive sheet resting on the front face,
   the deposition of a polymer material comprising conductive particles in a manner suitable for the polymer material comprising conductive particles to form, after deposition, an excess thickness on the back face, this deposition being carried out according to at least one of the two following options:
   in at least one connection well made in the thickness of the substrate, this connection well being at least partially closed at the level of the front face of the substrate by a conductive pad formed in the first conductive sheet,
   on a conductive pad formed in a second conductive sheet resting on the back face,
   characterized by the fact that:
   the polymer material comprising conductive particles exhibits, at the time of the deposition, a viscosity of between 1000 and 100 000 mPa·s, measured under oscillatory shear stress at 25° C. and at a frequency of 10 Hz, the method comprises a stage of setting of the polymer material comprising conductive particles, and a storage operation, comprising the rolling up on itself of the substrate, provided with the first conductive sheet and with the polymer material comprising conductive particles, or the stacking of portions of the substrate in the form of plates, this storage operation succeeding the setting stage and preceding an operation consisting in integrating said at least one module in the body of a chip card, and during which storage operation at least a portion of substrate, provided with the first conductive sheet and with the polymer material comprising conductive particles, is positioned above or below another portion of substrate, this other portion of substrate originating either from the substrate rolled up on itself, or from a plate of substrate deposited above or below said at least one portion of substrate, provided with the first conductive sheet and with the polymer material comprising conductive particles, the polymer material comprising conductive particles being configured by the setting stage in order not to adhere to this other portion of the substrate and in order to make possible, by at least the application of a pressure, the connection of said at least one module to an antenna.

2. The method as claimed in claim 1, in which the polymer material comprising conductive particles is a material having a storage modulus, after setting, of less than or equal to $10^8$ Pa and greater than or equal to $10^3$ Pa, under oscillatory stress at a frequency of 1 Hertz and at a temperature of between 120 and 170° C.

3. The method as claimed in claim 1, in which the deposition of the polymer material comprising conductive particles is carried out at a temperature of between 20 and 70° C.

4. The method as claimed in claim 1, in which the polymer material comprising conductive particles is a thermoplastic resin having a melting point of between 90 and 140° C. and in which this deposition of the polymer material is carried out at a temperature of between 90 and 140° C.

5. The method as claimed in claim 1, in which the polymer material comprising conductive particles is a pressure-sensitive adhesive.

6. The method as claimed in claim 1, in which the polymer material comprising conductive particles has thixotropic properties characterized by a viscosity which becomes greater than 300 000 mPa·s, under shear stress at a frequency of 0.1 Hz, after a time ranging from 0 seconds to 600 seconds following the moment of the deposition of the polymer material.

7. The method as claimed in claim 1, in which the polymer material comprising conductive particles is subjected to a setting operation by exposing it to ultraviolet radiation.

8. The method as claimed in claim 1, in which the polymer material comprising conductive particles is subjected, after deposition, to a heating operation.

9. The method as claimed in claim 1, in which the polymer material comprising conductive particles forms an excess thickness on the back face, the height of which is of between 60 and 250 micrometers.

10. A method for the interconnection of an antenna and of a module of a chip card comprising:

the provision of a chip card module obtained by the method of claim 1, the provision of a card body in which is integrated an antenna comprising at least two connection ends, the connection of at least one of the two connection ends with a conductive pad formed in the first conductive sheet at least partially closing a connection well in which is deposited polymer material comprising conductive particles, or with a conductive pad formed in the second conductive sheet resting on the back face and on which is deposited polymer material comprising conductive particles.

11. The interconnection method as claimed in claim 10, in which the connection is made by applying a pressure of between 0.5 and 5 bars, with a thermode, the temperature of which is between 170 and 210° C., and for a time of less than 3 seconds.

12. The interconnection method as claimed in claim 10, in which the connection between the antenna and the chip card module is produced by applying the polymer material comprising conductive particles to an end portion of the antenna forming zigzags comprising tracks spaced out from one another with a pitch of less than 250 micrometers.

13. A dual-interface chip card comprising a module and an antenna interconnected using a method as claimed in one of claim 10.

14. A strip of flexible material supporting a plurality of chip card modules which are obtained by the method as claimed in claim 1, rolled up on itself or in plates stacked one on top of the other.

15. The strip of flexible material as claimed in claim 14, in which the polymer material comprising conductive particles forms an excess thickness on the back faces of the modules of said plurality of modules, this excess thickness having a height of between 60 and 250 micrometers.

* * * * *